United States Patent [19]

Chonan

[11] Patent Number: 4,915,404
[45] Date of Patent: Apr. 10, 1990

[54] FRAME FOR A BICYCLE

[75] Inventor: Yoshiya Chonan, Toride, Japan

[73] Assignee: Sakae Ringyo Co., Ltd., Tokyo, Japan

[21] Appl. No.: 367,575

[22] Filed: Jun. 19, 1989

[30] Foreign Application Priority Data

Dec. 16, 1988 [JP] Japan .................. 63-163277

[51] Int. Cl.⁴ ............... B62K 19/34; B62K 19/30
[52] U.S. Cl. .................. 280/288.3; 74/502.2; 280/281.1
[58] Field of Search .............. 280/281.1, 288.3; 74/502.2, 488; 188/2 D

[56] References Cited

U.S. PATENT DOCUMENTS

| | | | |
|---|---|---|---|
| 4,565,383 | 1/1986 | Isaac | 280/281.1 X |
| 4,585,246 | 4/1986 | Dickman et al. | 280/281.1 |
| 4,768,798 | 9/1988 | Reed et al. | 280/281.1 |

FOREIGN PATENT DOCUMENTS

| | | | |
|---|---|---|---|
| 0411083 | 6/1947 | Italy | 280/281.1 |
| 61-310 | 8/1986 | Japan . | |

*Primary Examiner*—Charles A. Marmor
*Assistant Examiner*—Mitchell Bompey
*Attorney, Agent, or Firm*—Lowe, Price, LeBlanc, Becker & Shur

[57] ABSTRACT

A frame of a bicycle includes a down tube through which an operation cable passes. A bottom bracket is mounted to a lower end of the down tube so that the bottom bracket communicates with the down tube. A cable take-out opening used to take out the operation cable is formed in a bottom of the bottom bracket. The cable take-out opening is closed by a cable guide member for leading out the operation cable.

1 Claim, 6 Drawing Sheets

PRIOR ART

FRAME FOR A BICYCLE

FIELD OF THE INVENTION

The present invention relates to a frame of a bicycle including a down tube into which an operation cable for actuating a gearbox and a brake device is inserted and a bottom bracket.

BACKGROUND OF THE INVENTION

The operation cable is inserted into the down tube constituting a bicycle frame so as to prevent corrosion of the operation cable and improve the aesthetic appearance of the bicycle.

A conventional cable supporting device is shown in FIG. 6 (refer to Japanese Utility Model Publication No. 61-310). The cable supporting device includes a cable guide 2 disposed in a bottom bracket or hanger lug 1 and small openings 3 and 4 formed in a coupling portion of the bottom bracket 1. The operation cable 5 is guided through the down tube 6 by the cable guide 2 and taken out from the openings 3 or 4 externally.

When the operation cable 5 inserted into the down tube 6 is taken out from the opening 3 or 4, a finger is inserted into the bottom bracket 1 to guide the tip of the operation cable 5 toward the opening 3 or 4 by the finger and at the same time the operation cable 5 is required to be pushed into the down tube 6.

However, since the bottom bracket 1 has not enough space to freely move the finger and the diameters of the openings 3 and 4 are small, it requires much labor and time to take out the operation cable 5 from the openings 3 or 4 externally.

SUMMARY OF THE INVENTION

Accordingly, it is an object of the present invention to provide a frame of a bicycle in which an operation cable inserted into a down tube can be easily taken out externally.

According to the present invention, a cable take-out opening is formed in a bottom of a bottom bracket, and a cable guide member is detachably mounted to the bottom to close the cable take-out opening and is provided with a leading-out hole into which an operation cable is inserted to be taken out externally.

The operation cable inserted into a down tube is taken out through the cable take-out opening to the outside of a bottom bracket. Then, the operation cable is inserted into the leading-out hole of the cable guide member, which is then attached to the bottom so as to close the cable take-out opening. Accordingly, the operation cable can be taken out in a short time easily and efficiently.

DETAILED DESCRIPTION OF THE PREFERRED EMBODIMENTS

An embodiment of the present invention is now described in detail with reference to the drawings.

Figure 4:
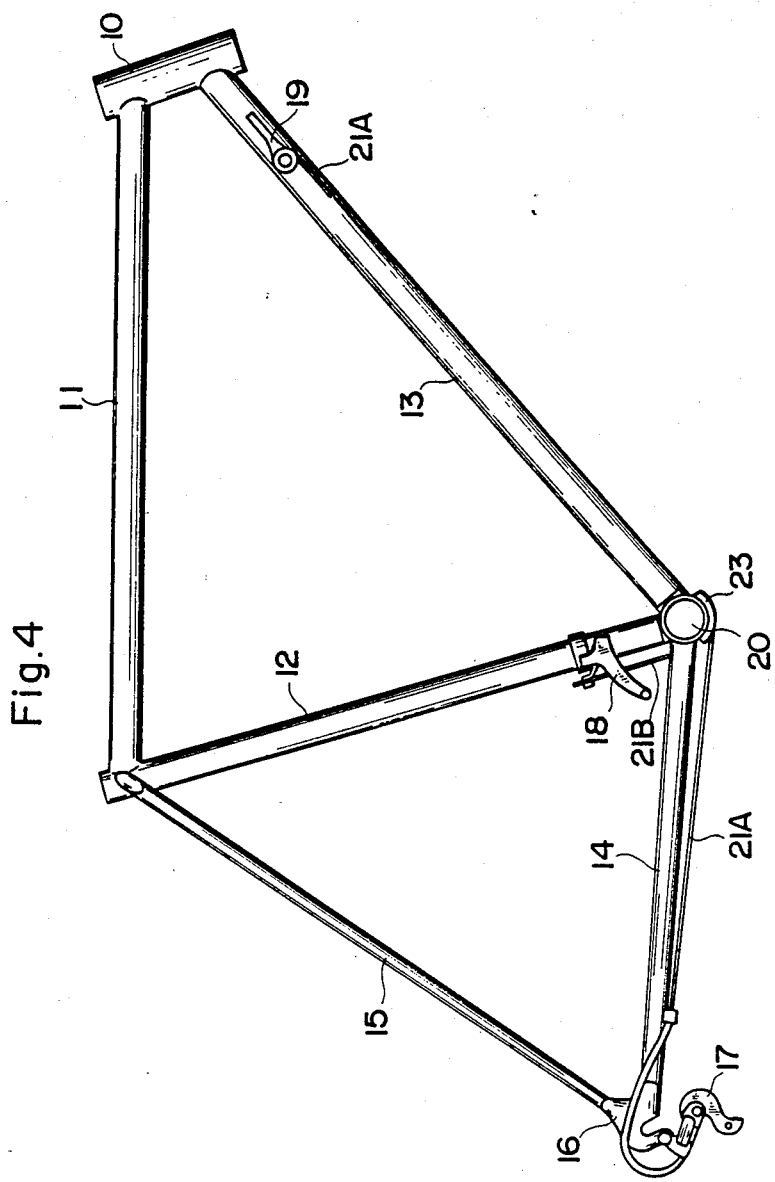
FIG. 4 shows a whole structure of a bicycle frame.

FIG. 4 shows a whole structure of a bicycle frame according to the present invention, in which numeral 10 denotes a head tube made of aluminum. One end of a top tube 11 is fitted onto an upper lug or projection (not shown) of a head tube 10 and the other end of the top tube 11 is fitted onto a lug disposed in an upper end of a seat tube 12. An upper end of a down tube 13 is fitted onto a lower lug of the head tube 10, and respective lower ends of the down tube 13 and the seat tube 12 are fitted onto respective lugs of a hanger lug or bottom bracket 20.

Figure 1:
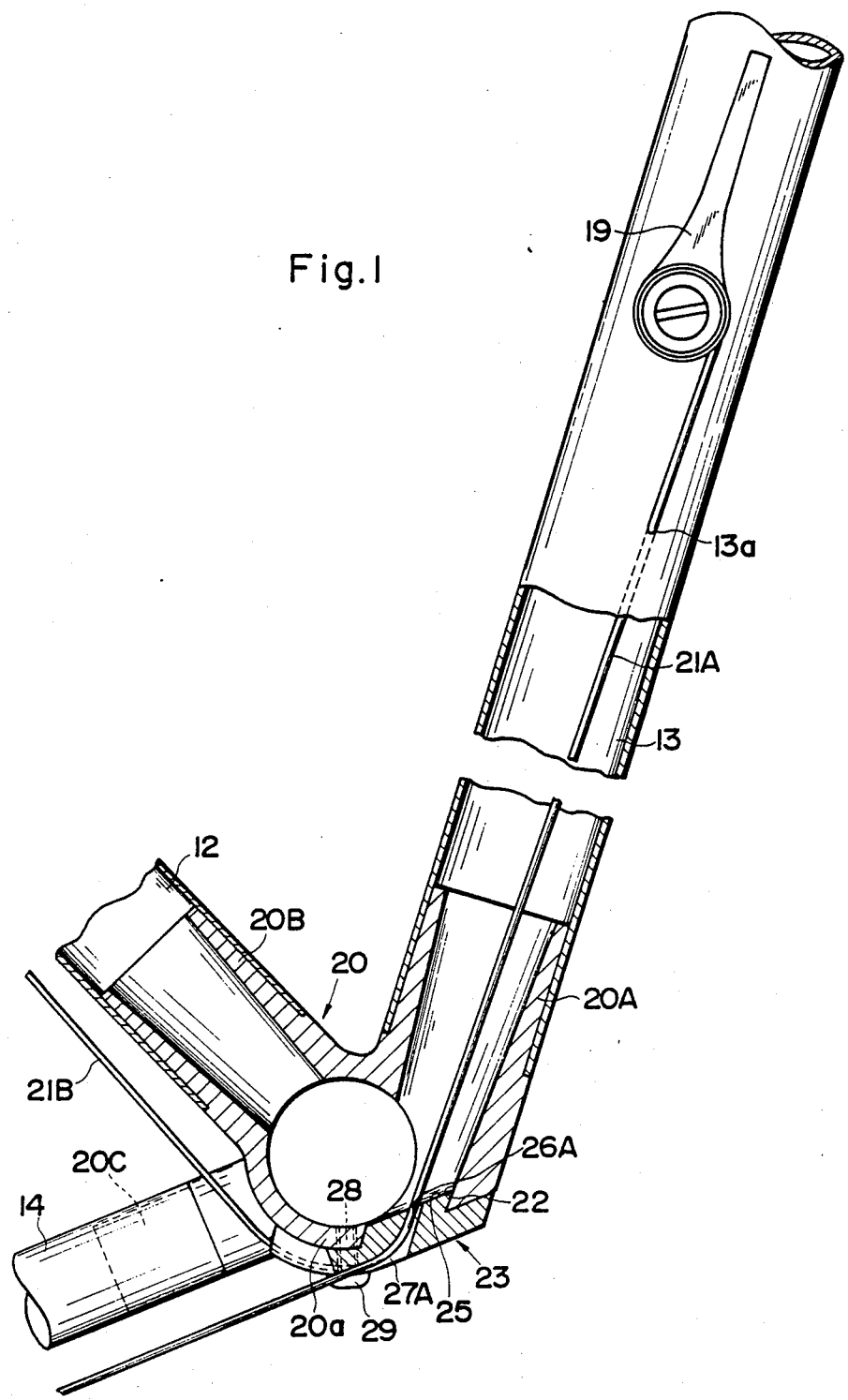
FIGS. 1 and 2 are a sectional view and a bottom view of a portion of a bicycle frame according to the present invention, respectively.
Figure 2:
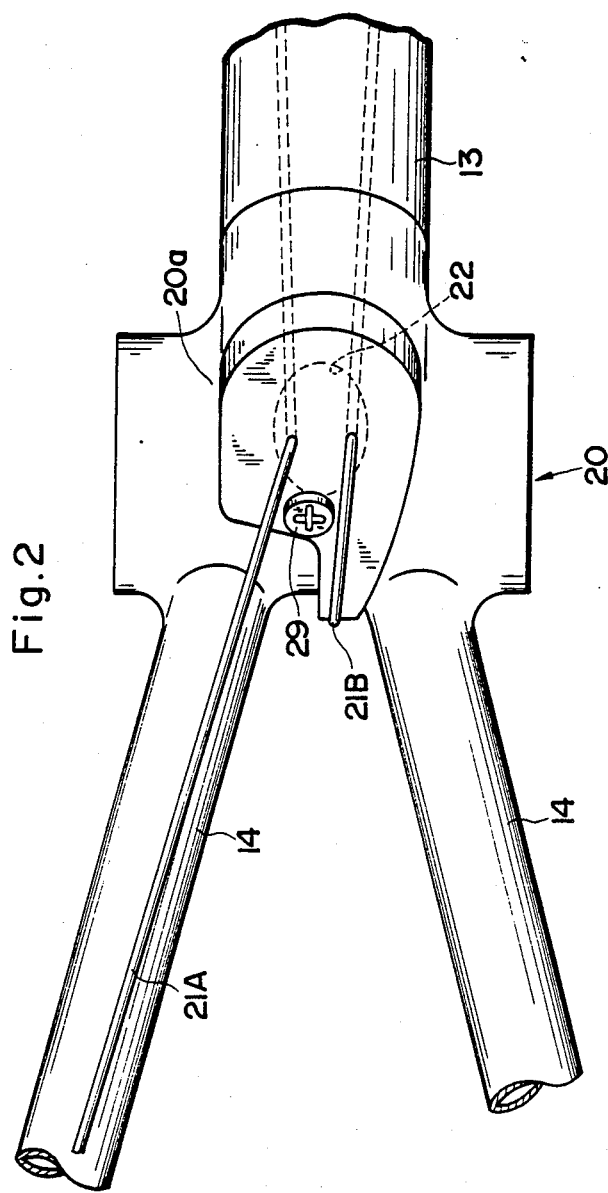
Figure 3:
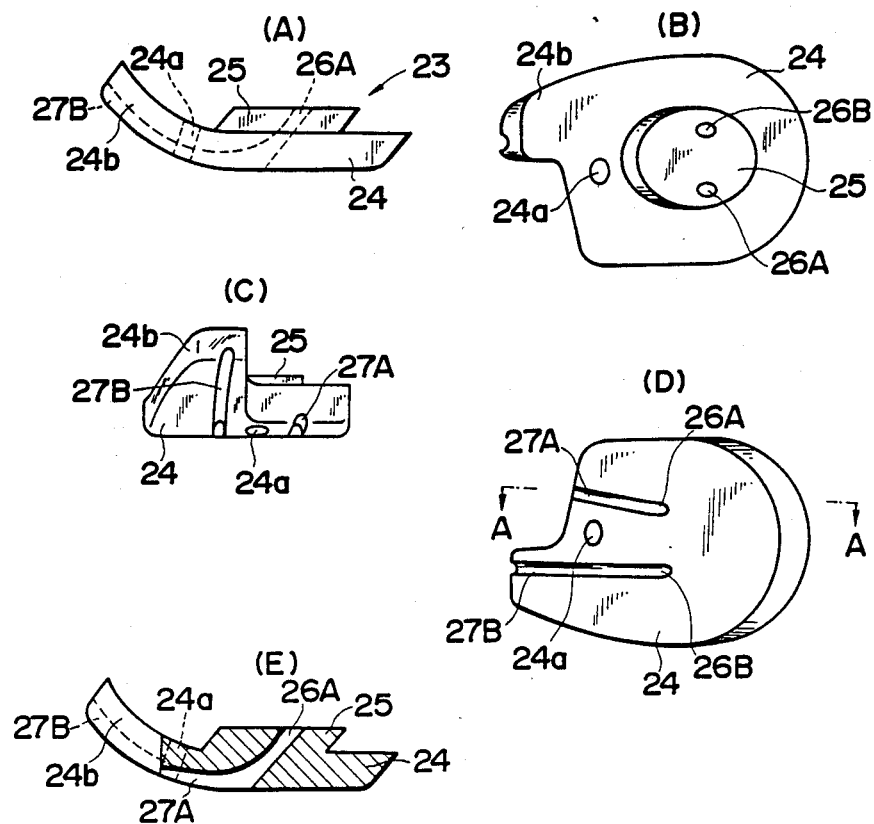
FIGS. 3(A) to (E) are a front view, a plane view, a side view, a bottom view and a sectional view taken along a line A—A in FIG. 3(D) showing a cable guide member according to the present invention, respectively.

FIG. 1 is a sectional view showing a portion of a bicycle frame of the present invention and FIG. 2 is a bottom view thereof. In FIGS. 1 and 2, the bottom bracket 20 includes projections 20A and 20B extending into a V-letter shape. The lower end of the down tube 13 is fitted onto one projection 20A and the lower end of the seat tube 12 is fitted onto the other projection 20B. Further, the bottom bracket 20 is provided with a pair of protrusions 20C having a small diameter and extending in the horizontal direction. One end of chain stays 14 are fitted onto the protrusions 20C, respectively. As shown in FIG. 4, a fork end 16 is attached to the other end of each of the chain stays 14 and a lower end of each of back forks 15, and an upper end of each of the back forks 15 is fixedly mounted to the upper end of the seat tube 12. A rear gearbox 17 is attached to the fork end 16 and a front gearbox 18 is attached to the lower end of the seat tube 12. An operation lever 19 is mounted on one side of an upper portion of the down tube 13 and an end of an operation cable 21A is coupled with the operation lever 19. The operation cable 21A passes through the inside of the down tube 13 and is taken out from the bottom bracket 20 externally with the other end of the operation cable 21A being coupled with the rear gearbox 17, as described later. Another operation lever not shown is mounted on the other side of the upper portion of the down tube 13 and an end of another operation cable 21B is coupled with this operation lever. The operation cable 21B also passes through the inside of the down tube 13 (refer to FIG. 2) and is taken out from the bottom bracket 20 externally with the other end of the operation cable 21B being coupled with the front gearbox 18.

Figure 5:
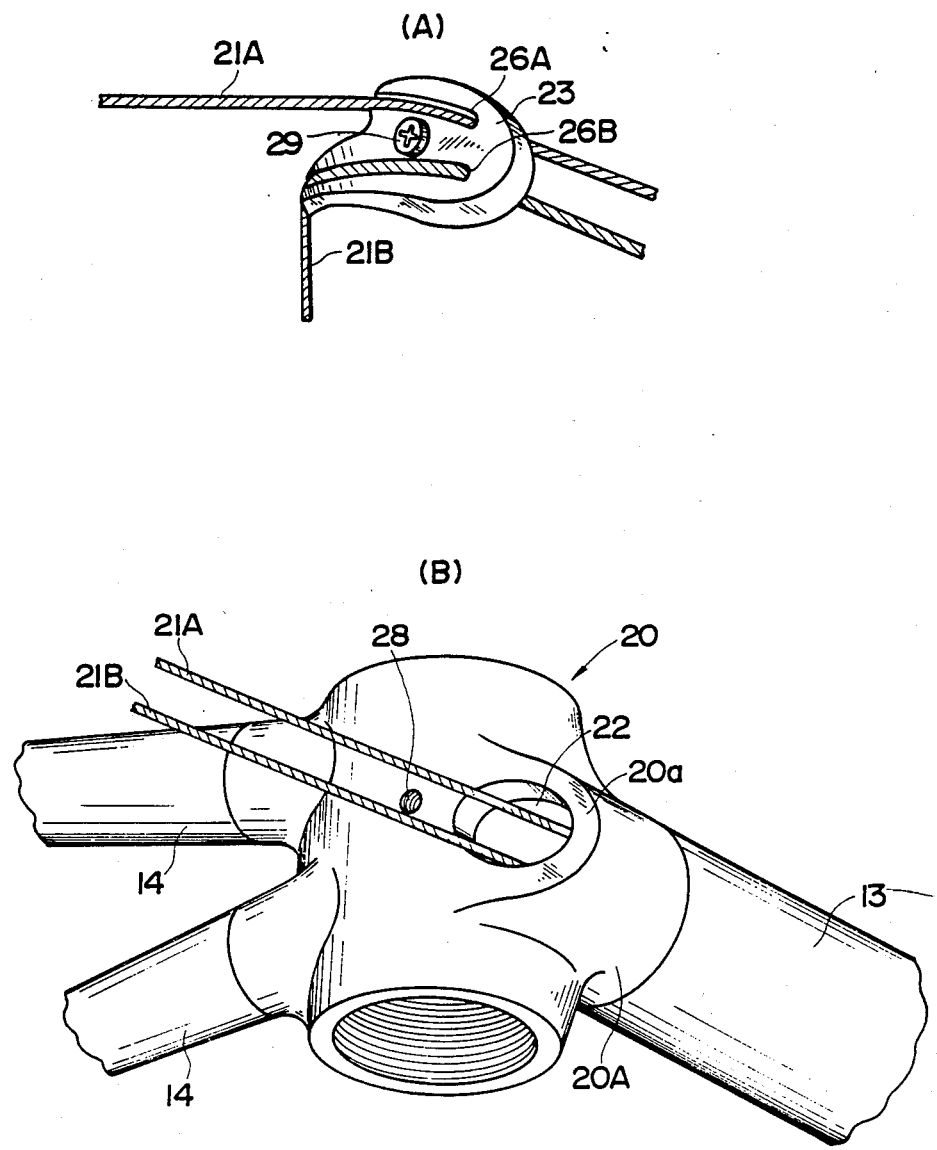
FIGS. 5(A) and (B) are perspective views showing the cable guide member and a bottom bracket, respectively.
Figure 6:
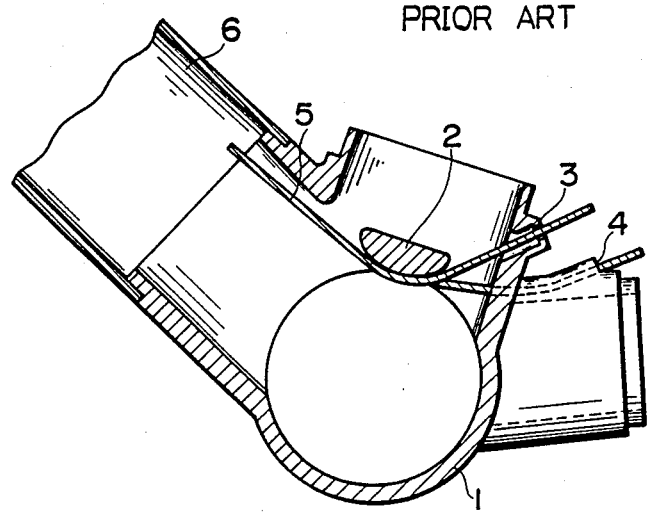
FIG. 6 is a sectional view showing a portion of a conventional bicycle frame.

As shown in FIGS. 1 and 5(B), a cable take-out opening 22 having a large diameter is formed in the bottom 20a of the bottom bracket 20, and a threaded hole 28 is formed near the opening 22. The cable take-out opening 22 is adapted to be closed by a cable guide member 23, which is shown in FIGS. 3(A) to (E) and 5(A). The cable guide member 23 includes a body 24 which covers the cable take-out opening 22 and a fitted projection 25 formed on the body 24 which is formed with a through hole 24a. Leading-out holes 26A and 26B are formed in the fitted projection 25 and the body 24 so that the holes 26A and 26B pass through the projection 25 and the body 24. One hole 26A communicates with a guide groove 27A formed on the lower surface of the body and the other hole 26B communicates with a guide member 27B formed on the lower surface of an extension 24b projected from the body 24.

Operation of leading out the operation cable is now described.

As shown in FIG. 1, each end of the operation cables 21A and 21B is coupled with the operation lever 19 and the cables 21A and 21B are inserted through small holes 13a disposed in the down tube 13 into the down tube 13. Then, as shown in FIG. 5(B), the operation cables 21A and 21B inserted into the down tube 13 are taken out from the cable take-out opening 22 formed in the bottom 20a of the bottom bracket 20 externally.

Ends of the operation cables 21A and 21B pass through the leading-out holes 26A and 26B formed in the cable guide member 23, respectively, as shown in FIG. 5(A).

Then, as shown in FIG. 1, the fitted projection 25 of the cable guide member 23 is fitted in the cable take-out opening 22 to close the opening 22.

Finally, a fixing bolt 29 is inserted into the through hole 24a of the cable guide member 23 and is screwed into the threaded hole 28 formed in the bottom 20a of the bottom bracket 20 so that the cable guide member 23 is fixedly attached to the bottom bracket 20.

The operation cable 21A led out through the hole 26A of the cable guide member 23 is engaged in the guide groove 27A of the cable guide member 23 and is led by the guide groove 27A so that the operation cable 4A is coupled with the rear gearbox 17 as described above. Further, the other operation cable 21B is led by the other guide groove 27B of the cable guide member 23 upward so that the cable 21B is coupled with the front gearbox 18.

As described above, by providing the cable takeout opening 22 having a large diameter in the bottom bracket 20, the operation cables 21A and 21B can be taken out from the bottom bracket 20 externally. Thereafter, the cable take-out opening is closed by the cable guide member 23 and the fixing bolt 29 is screwed so that the bottom bracket 20 can be attached to the cable guide member 23. Accordingly, the operation of leading out or taking out the operation cables 21A and 21B can be completed easily in a short time.

In the embodiment, the cable guide member 23 may be mounted to the bottom bracket 20 by fitting the projection 25 into the cable take-out opening 22.

Further, even in the case where the operation cable coupled with the brake device has been inserted into the down tube 13, the operation cable may be taken out from the cable take-out opening 22 of the bottom bracket 20 and the cable guide member 23 may be attached to the bottom bracket 20.

I claim:

1. A frame of a bicycle including a down tube through which an operation cable passes and a bottom bracket mounted to a lower end of said down tube so that said bottom bracket communicates with said down tube, comprising a cable takeout opening formed in a bottom of said bottom bracket to be used to take out the operation cable and a cable guide member attached detachably to the bottom of the bottom bracket to close said cable take-out opening and including a leading-out hole through which the operation cable extends out of the frame.

* * * * *